United States Patent [19]

Ogawa et al.

[11] Patent Number: 5,449,544
[45] Date of Patent: Sep. 12, 1995

[54] WEATHER STRIP FOR AN AUTOMOBILE AND A METHOD FOR ASSEMBLING THE SAME

[75] Inventors: Kazuo Ogawa; Masahiro Koide; Shinichi Yoshioka; Masahiro Nozaki, all of Nakashima, Japan

[73] Assignee: Toyoda Gosei Co., Ltd., Nishikasugai, Japan

[21] Appl. No.: 70,523

[22] Filed: Jun. 3, 1993

[30] Foreign Application Priority Data

| Jun. 6, 1992 [JP] | Japan | 4-172062 |
| Jun. 6, 1992 [JP] | Japan | 4-172063 |
| Jan. 21, 1993 [JP] | Japan | 5-027425 |
| Apr. 21, 1993 [JP] | Japan | 5-119105 |

[51] Int. Cl.$^6$ ............................................ E06B 7/16
[52] U.S. Cl. .................................. 428/122; 49/475.1; 296/93; 428/358
[58] Field of Search .................... 49/475.1; 296/93; 428/31, 122, 358

[56] References Cited

U.S. PATENT DOCUMENTS

| 4,263,750 | 4/1981 | Hein ............................ 49/490.1 |
| 4,614,347 | 9/1986 | Kruschwitz ................. 296/93 X |
| 4,617,220 | 10/1986 | Ginster ........................ 428/122 |
| 5,149,169 | 9/1992 | Nozaki ........................ 296/206 |
| 5,154,952 | 10/1992 | Nozaki ...................... 428/122 X |
| 5,258,157 | 11/1993 | Nozaki et al. ............. 428/122 X |
| 5,304,409 | 4/1994 | Nozaki ........................ 428/122 |

FOREIGN PATENT DOCUMENTS

| 146101 | 6/1985 | European Pat. Off. |
| 3506009 | 5/1991 | Germany. |
| 4041175 | 7/1992 | Germany. |
| 2171442 | 8/1986 | United Kingdom. |

*Primary Examiner*—Henry F. Epstein
*Attorney, Agent, or Firm*—Cushman Darby & Cushman

[57] ABSTRACT

A weather strip for an automobile comprising a trim portion securable to a flange of an automobile. The trim portion has a holding piece and a concave portion. The concave portion is disposed at a base portion of the holding piece and is in contact with an end of the flange. The concave portion is cooperable with the end of the flange to enable the trim portion to be slidably rotatable with respect to the end of the flange when being secured to the flange. An adhesive is provided at an inner surface of the holding piece for adhering the trim portion to the flange.

26 Claims, 7 Drawing Sheets

PRIOR ART

FIG. 13

PRIOR ART

FIG. 14

WEATHER STRIP FOR AN AUTOMOBILE AND A METHOD FOR ASSEMBLING THE SAME

BACKGROUND OF THE INVENTION

1. Field of the Invention

The present invention relates to a weather strip which is assembled onto a flange of an automobile body with an adhesive, and also relates to a method for assembling the same.

2. Description of Related Art

Figure 13:
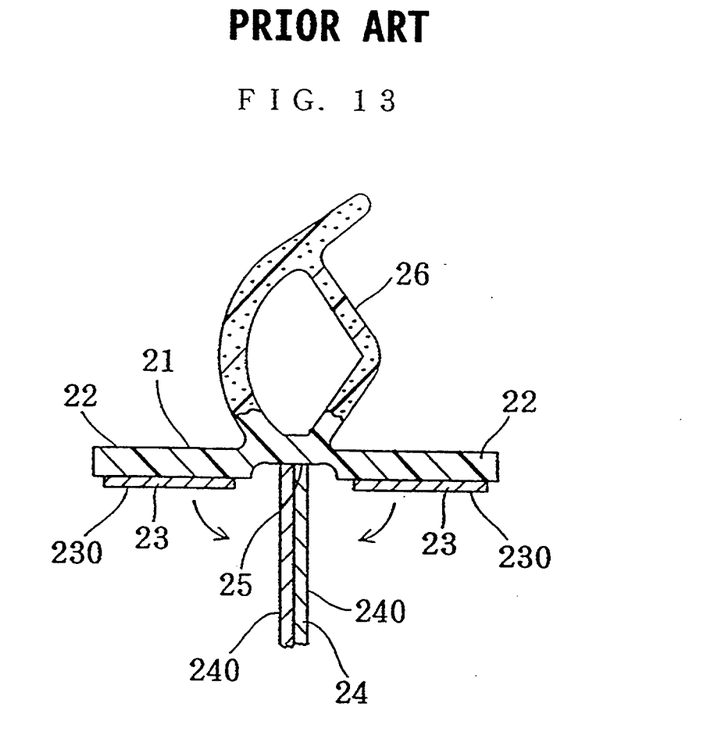
FIG. 13 is a cross section of a weather strip of the prior art.

A related weather strip has been disclosed, for example, in U.S. Pat. No. 4,617,220. In the weather strip disclosed therein, as represented by FIG. 13 of the attached drawings, a trim portion 21 has a pair of attachment pieces 22 provided with adhesive double sided tape 23. During assembly, the attachment pieces 22 are bent downwardly and inwardly towards one another as indicated by the arrows in FIG. 13, and an adhesive surface 230 of the adhesive double sided tape 23 adheres to an adhesion surface 240 of a flange 24. Flange 24 is fixed to the automobile body and serves to support the trim portion 21. A hollow sealing portion 26 is provided on the outer surface of trim portion 21 and is positioned so as to be partially compressed by another body (such as a door or the like) and provide a seal between the flange and such body.

In this weather strip, however, the lower surface 25 of the trim portion 21 between the attachment pieces 22 is flat, and, as a result, the trim portion 21 cannot be accurately positioned in the widthwise direction (left to right in FIG. 13), relative to the flange 24. Therefore, during assembly, the trim portion 21 may be improperly aligned with respect to flange 24, and sealing portion 26 may thus be unable to accomplish its proper sealing function.

Figure 14:
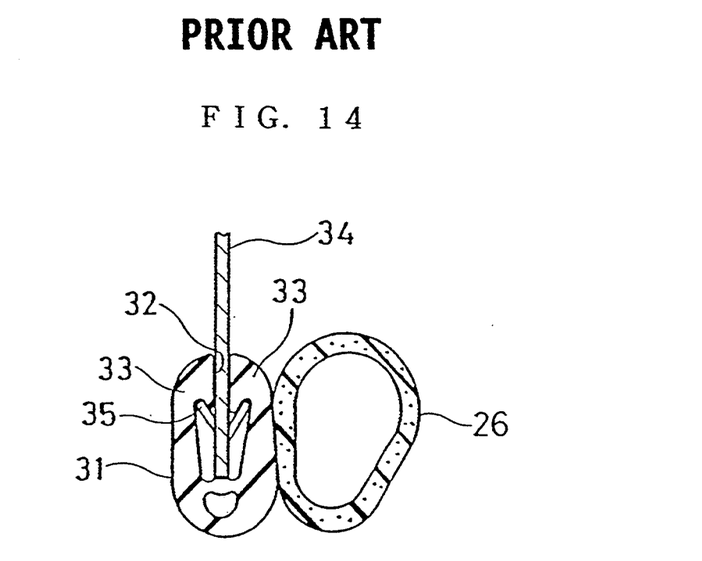
FIG. 14 is a cross section of another weather strip of the prior art.

Another type of a weather strip has been disclosed in U.S. Pat. No. 4,263,750. In this weather strip, as shown in FIG. 14, a trim portion 31 having a substantially oval-shaped section is integrally provided with a slit 32, forming a pair of legs 33. A flange 34 is inserted into the slit 32, and a tip end of each leg 33 is engaged with a respective partially cut and bent piece 35 extending from flange 34. The trim portion 31 is thus assembled onto the automobile body.

In this weather strip, however, since the flange 34 must be provided with the aforementioned partially cut and bent pieces 35 in order to prevent disengagement of the trim portion 31 therefrom, the cost of manufacturing this flange is relatively high.

SUMMARY OF THE INVENTION

An object of the present invention is to provide a weather strip for an automobile which can be securely adhered to an inexpensively manufactured flange. Another object of the present invention is to provide a simple method of assembling the weather strip which ensures accurate positioning of the portion relative to the flange.

In order to achieve the above object, the present invention provides a weather strip for an automobile including a trim portion securable to a flange of an automobile body. The trim portion has a holding piece and a concave portion. The concave portion is provided at a base portion of the holding piece and is in contact with an end of the flange. The concave portion is cooperable with the end of the flange to enable the trim portion to be slidably rotatable with respect to the end of the flange when being secured to the flange. In addition, an adhesive is provided at an inner surface of the holding piece for adhering the trim portion to the flange. The configuration of the holding piece and the position of the adhesive, which is preferably double sided tape, may be varied according to the configuration of the particular flange.

The present invention applies to weather strips provided on various portions of an automobile, such as the trunk, sliding roof, drip seal, door glass, roof side, and door opening or frame.

In assembling the weather strip of the present invention, the concave portion of the trim portion bears against the tip end of the flange so as to determine the widthwise position of the trim portion with respect to the flange and to also determine the center of rotation of the trim portion with respect to the flange during assembly. During assembly, the trim portion is rotated around the flange while the concave portion maintains contact with the tip end of the flange. As a result holding piece is brought toward the flange and securely adhered thereto by the adhesive surface of the adhesive double sided tape disposed between the holding piece and an adhesion surface of the flange. Therefore, the trim portion can be easily and precisely assembled at the desired position on the flange. Furthermore, because an adhesive, such as double sided tape, is used to prevent disengagement of the trim portion from the flange, the flange does not require a cut and bent portion or the like. As a result, the weather strip can be securely fastened to an inexpensively manufactured flange.

The trim portion is preferably formed from a solid rubber (generally extruded) capable of maintaining a tight hold on the flange. The solid rubber may be, for example, EPDM (ethylene-propylene-diene copolymer) solid rubber.

The trim portion preferably has its outer surface provided with a sealing element formed of soft and elastic sponge rubber.

The trim portion may be provided with a second holding piece, which is preferably provided with a recess at the inner surface of its base. The recess ensures that the base portion of the second holding piece does not interfere with the tip end of the flange during rotation of the trim portion around the contact portion between the concave portion and the flange. Even if the tip end of the second holding piece bends to some extent, a bulge caused by this bend is located in the recess so that the concave portion is not narrowed and the trim portion can still be rotated through a large angle.

It is preferable that only the first holding piece bear the adhesive double sided tape. Since the double sided tape is provided on only one holding piece, the amount of the adhesive double sided tape can be conserved, and expenses thereby saved. Typically, the width of the adhesive double sided tape corresponds to the width of the first holding piece so as to substantially cover the inner surface of the first holding piece. The second holding piece is formed to have its tip end located substantially at the same level as an inner edge, adjacent the concave portion, of the adhesive double sided tape. Thus, it can be appreciated that the holding pieces have different lengths, which allows the concave portion to easily engage the flange.

The second holding piece is preferably thinner than the first holding piece so that the second holding piece can be easily bent during assembly.

The first holding piece may have its inner surface provided with a small projection pressing against the flange for enhancing the sealing capability of the strip. The first holding piece may further be provided, at its tip end, with a lip bearing against the flange. The lip also improves the sealing capability of the strip.

The concave portion may have a diameter larger than the thickness of the flange, in which case the trim portion can be smoothly and easily rotated while maintaining contact between the concave portion and the tip end of the flange.

Alternatively, the concave portion may have a diameter substantially equal to the thickness of the flange, which enables the trim portion to tightly grip the flange. In this case, the concave portion is forced to engage the tip end of the flange while maintaining the bent state of the holding piece in an inclined position during assembly.

The present invention also provides an assembly method including the steps of, engaging a concave portion of the weather strip with an end of a flange of an automobile such that a holding piece of the weather strip is inclined with respect to an adhesion surface of the flange, rotating the weather strip around portions of engagement between the concave portion and the flange such that the holding piece is directed toward the adhesion surface of the flange, and adhering the holding piece to the adhesion surface of the flange. This assembly method may be executed manually or by an automatic assembly machine.

The method of the present invention enables easy, precise assembly of the weather strip to the flange.

Other objects of this invention will become apparent upon an understanding of the following illustrative embodiments and claims. Advantages not referred to herein will occur to one skilled in the art upon employment of the invention in practice.

DETAILED DESCRIPTION OF THE PREFERRED EMBODIMENTS

In the first embodiment of the present invention, the weather strip is attached to a trunk of an automobile. This embodiment will be described below with reference to FIGS. 1 and 2. A weather strip W1 of the first embodiment is integrally provided with a trim portion 2 attached to a flange 1 of an automobile body. A hollow sealing element 3 is secured to trim portion and seals the gap between the body and the trunk lid (not shown). The trim portion 2 is formed of EPDM solid rubber extruded into a substantially J-shaped section. The hollow sealing element 3 is formed of EPDM sponge rubber formed by common extrusion and has a substantially O-shaped section. In order to reduce the weight of the weather strip, the trim portion 2 is made from hard solid rubber so that it does not have to be reinforced with a metal insert.

The trim portion 2 is provided with a pair of long and short holding pieces, 4 and 5 respectively, for holding flange 1. The long holding piece 4 is provided at its inner surface with an adhesive double sided tape 6 for adhering the long holding piece 4 to an adhesion surface 10 of the flange 1. The width of the adhesive double sided tape 6 (top to bottom in FIG. 1) substantially correlates to the width of the long holding piece 4 (also top to bottom in FIG. 1) so as to cover the majority of the inner surface 44 of long holding piece 4. The short holding piece 5 has its tip end 41 located substantially at the same level as an inner edge of the adhesive double sided tape 6. On an outer surface of the short holding piece 5, a cover lip 7 is formed by common extrusion. The cover lip 7 is made of EPDM sponge rubber and covers an edge portion of an interior member (not shown) of the trunk.

Figure 1:
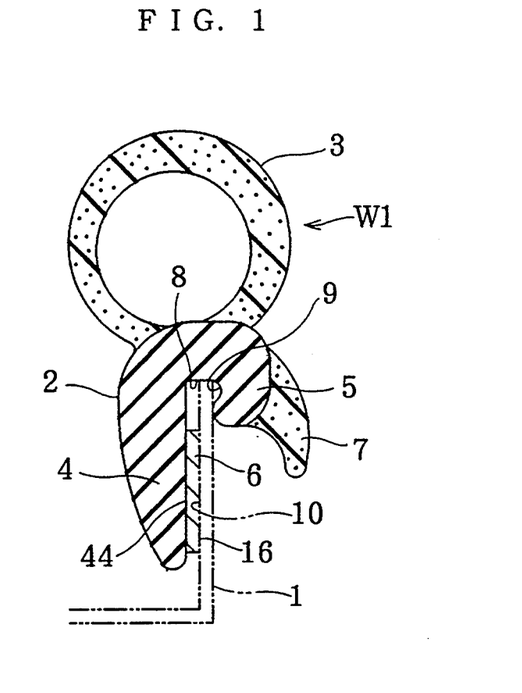
FIG. 1 is a cross section of a weather strip for a trunk of a first embodiment of the present invention.

The holding pieces 4 and 5 are provided, at a base portion therebetween, with a concave portion 8, which comes into contact with the tip end of the flange 1. The concave portion 8 serves to determine the widthwise position of the trim portion 2 with respect to the flange 1. Concave portion 8 also defines a center of rotation of the trim portion during assembly. In order to enable the trim portion 2 to rotate smoothly while maintaining contact between the tip end of the flange 1 and the concave portion 8, the concave portion 8 is provided with a width slightly larger than a thickness of the flange 1 and includes a recess 9 at the base portion of the short holding piece 5 in this embodiment.

Figure 2:
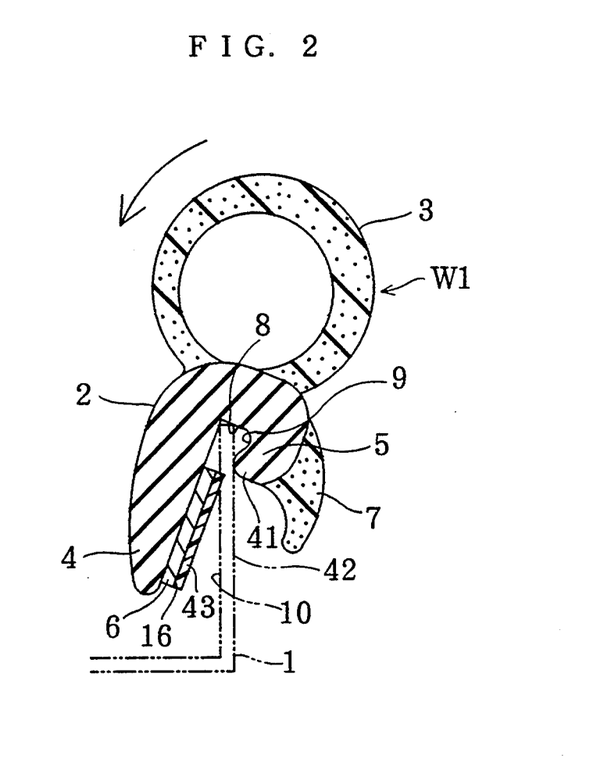
FIG. 2 is a cross section illustrating an assembly method of the weather strip in FIG. 1.

An assembly method of the weather strip W1 of the first embodiment thus constructed will now be described hereinbelow. In the assembly operation, as shown in FIG. 2, the concave portion 8 is first engaged with flange 1 while maintaining a position in which the trim portion 2 is inclined with respect to the adhesion surface 10 of the flange 1. The concave portion 8 easily engages flange 1 because the holding pieces 4 and 5 have different lengths. In this engaged state, the bottom surface of the concave portion 8 is in contact with the end of the flange 1, and the tip end 41 of the short holding piece 5 is in contact with the exterior surface 42 of flange 1. The widthwise position of the trim portion 2 with respect to flange 1 and the center of rotation thereof is thereby determined.

While the inclination of the trim portion 2 with respect to flange 1 is maintained, a release liner 43 of the adhesive double sided tape 6 is peeled off to expose an adhesive surface 16. Then, the trim portion 2 is rotated in a direction (indicated by an arrow) around the portion of contact between the concave portion 8 and the flange 1 so that the double sided tape 6 adheres the long holding piece 4 to the adhesion surface 10 of the flange 1. Since the concave portion 8 includes recess 9, the base portion of the short holding piece 5 does not interfere with the tip end of flange 1. Even if the tip end 41 of the short holding piece 5 bends to some extent, a bulge caused by this bend is located in the recess 9, so that concave portion 8 is not narrowed. Therefore, the trim portion 2 can be rotated through a large angle, and the long holding piece 4 can be firmly pressed and adhered to flange 1.

As a result of the foregoing process, the trim portion 2 is securely attached to flange 1, as shown in FIG. 1, and thereby, the weather strip W1 is assembled onto the automobile body. In the instance in which the release liner 43 of the adhesive double sided tape 6 is not provided or is peeled off prior to engagement of the concave portion 8 with the tip end of flange 1, this peeling step can obviously be omitted from the present method of assembly. It should also be noted that while it is preferable to use double sided tape as the adhesive, other adhesives, such as glue, may be employed.

According to the weather strip W1 and the assembly method of this embodiment, the trim portion 2 maintains its widthwise position with respect to flange 1 while being rotated about the end of flange 1. Therefore, the weather strip W1 can be easily assembled at a precise position on the flange 1. Strong adhesion of the trim portion 2 to flange 1 is achieved by the adhesive double sided tape 6 provided on the long holding piece 4 so that the flange 1 can be manufactured without a cut and bent piece or the like. This significantly reduces manufacturing costs. In addition, since only one of the two holding pieces is provided with the double sided tape 6, a relatively small amount of tape is used, which further adds to the savings in manufacturing costs.

In the second embodiment of the present invention, the weather strip is attached to a sliding roof of an automobile. This embodiment will be described below with reference to FIGS. 3 and 4, in which the corresponding portions of the first embodiment bear the same reference numerals. A weather strip W2 of the second embodiment is integrally provided with trim portion 2 attached to flange 1 of roof 11. The hollow sealing element 3 seals a gap between the sliding roof 11 and a frame or body 12. The hollow sealing element 3 is made of EPDM solid rubber, which is softer than the trim portion 2, and has fixed electrostatic hairs 13 provided at its outer surface for promoting slippage with respect to body 12 during rotation of trim portion 2. As an alternative to fixed electrostatic hairs 13, urethane may be applied to the outer surface of the hollow sealing 3 for smoothing the same.

Figure 3:
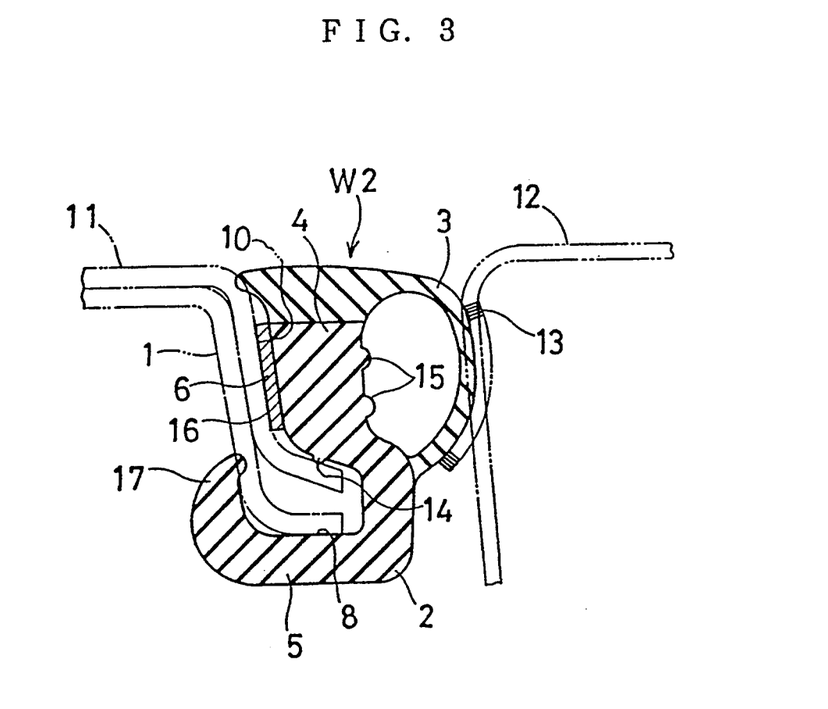
FIG. 3 is a cross section of a weather strip for a sliding roof of a second embodiment of the present invention.

The trim portion 2 is provided with a pair of upper and lower holding pieces, 4 and 5 respectively, for holding the trim portion 2 to the flange 1. The upper holding piece 4 has adhesive double sided tape 6 adhered to its inner surface for adhering weather strip W2 to the adhesion surface 10 of the flange 1. The upper holding piece is also provided with small projections 14 bearing against flange 1 to provide a seal therebetween. On the outer surface of the holding piece 4, there is provided a pair of ribs or protrusions 15 for preventing a deformed adhesion of the center of hollow sealing element 3 to trim portion 2. The lower holding piece 5 is thinner than the upper holding piece 4 for facilitating bending thereof during assembly. The lower holding piece 5 is also provided with an end lip 17 pressed against the exterior surface of the flange 1. The holding pieces 4 and 5 are provided with the concave portion 8 at the base thereof. The tip end of the flange 1 bears against the concave portion 8, which has a depth that permits absorption of positional deviation of the tip end of the flange 1.

Figure 4:
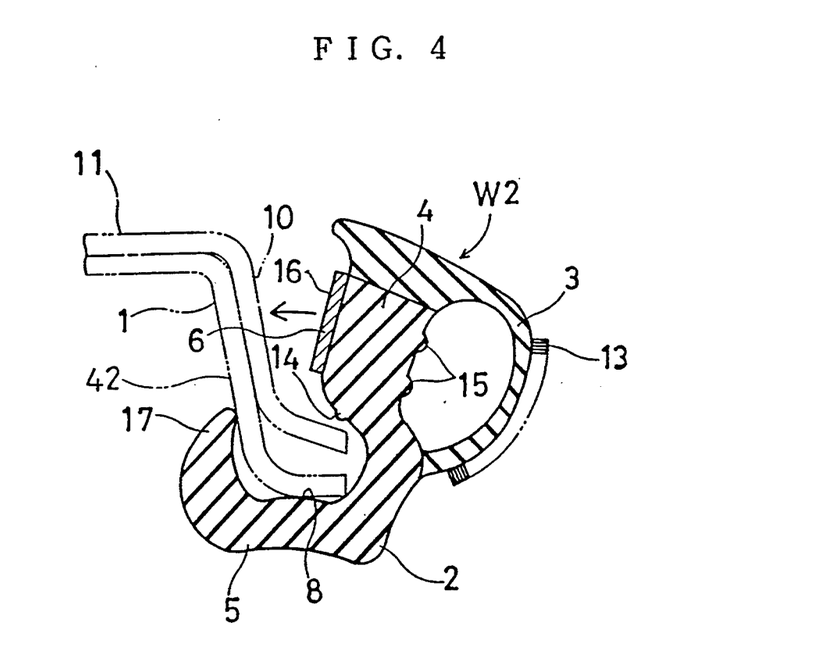
FIG. 4 is a cross section illustrating an assembly method of the weather strip in FIG. 3.

In the assembly of the weather strip W2, as shown in FIG. 4, the holding piece 4 is bent outwardly so as to be inclined with respect to flange 1. The concave portion 8 is engaged with the flange 1 while maintaining this inclined position. As a result, the concave portion 8 contacts the lower surface of flange 1 so as to determine the relative position of the trim portion 2 with respect to the flange 1. In this manner, the center of rotation of trim portion 2 is also determined. Then, by rotating the trim portion 2 around the contact portion in the direction indicated by the arrow in FIG. 4, the upper holding piece eventually meets flange 1, with the adhesive double sided tape 6 therebetween. The double sided tape 6 serves to adhere holding piece 4 to adhesion surface 10 of the flange 1. Thereby, as shown in FIG. 3, the trim portion 2 is securely attached to the flange 1, and the weather strip W2 is precisely assembled onto the periphery of the sliding roof 11.

In a third embodiment of the present invention, the weather strip operates as a drip sealing of an automobile. This embodiment will be described below with reference to FIGS. 5 and 6. Weather strip W3 of the third embodiment is integrally provided with the trim portion 2 attached to flange 1 of the automobile body. A water receiving lip 18 extends from trim portion 2 and receives water at the inside of the automobile door (not shown). The trim portion 2 includes holding piece 4 of a substantially L-shaped section for securing a bent portion 1a of the flange 1. The adhesive double sided tape 6 is adhered to the inner surface of the L-shaped holding piece 4. The C-shaped holding piece 5 is provided with concave portion 8, which comes into contact with the lower portion of the bent portion 1a. The weather strip W3 may include a hollow sealing element 3, if required.

Figure 5:
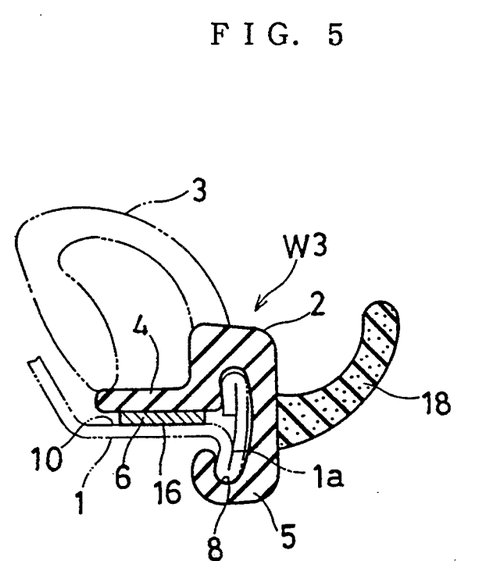
FIG. 5 is a cross section of a weather strip for a drip sealing of a third embodiment of the present invention.
Figure 6:
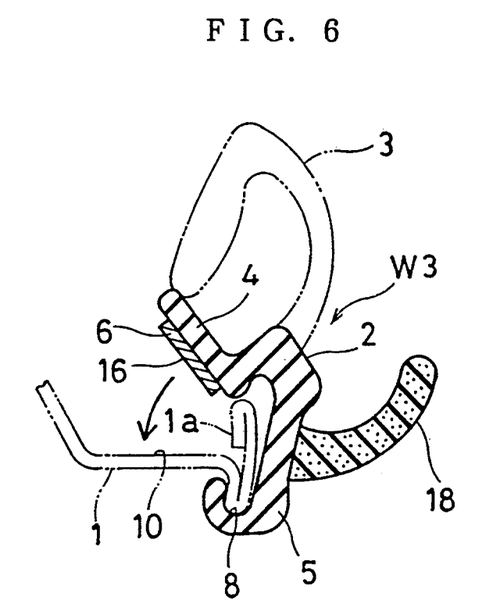
FIG. 6 is a cross section illustrating an assembly method of the weather strip in FIG. 5.

In the assembly of weather strip W3, as shown in FIG. 6, the L-shaped holding piece 4 is bent outwardly so that trim portion 2 is inclined with respect to adhesion surface 10 of flange 1. Concave portion 8 is engaged with the flange 1 while the L-shaped holding piece 4 maintains the inclined position. As a result, the concave portion 8 bears against the lower portion of the bent portion 1a so as to determine the relative vertical and horizontal positions of the trim portion 2 with respect to flange 1. In addition, the center of rotation of trim portion 2 with respect to flange 1 during assembly is also determined. Thereafter, by rotating the trim portion 2, around the contact portion in the direction indicated by the arrow in FIG. 6, the L-shaped holding piece 4 eventually meets flange 1, with the adhesive double sided tape 6 therebetween. The double sided tape 6 serves to adhere L-shaped holding piece 4 to adhesion surface 10 of the flange 1. Thus, as shown in FIG. 5, the trim portion 2 is securely attached to the flange 1, and the weather strip W3 is precisely assembled onto the body.

Figure 7:
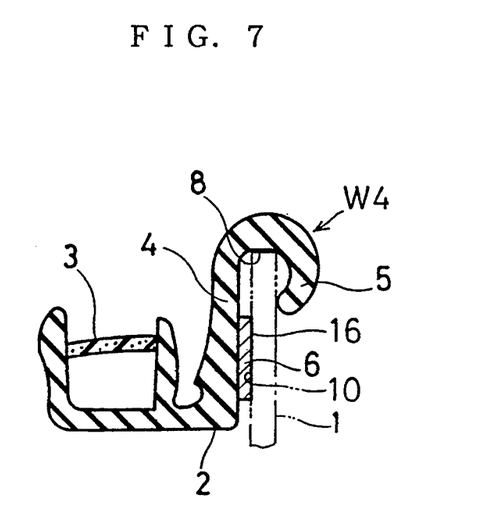
FIG. 7 is a cross section of a door glass run illustrating another example to which the present invention applies.
Figure 8:
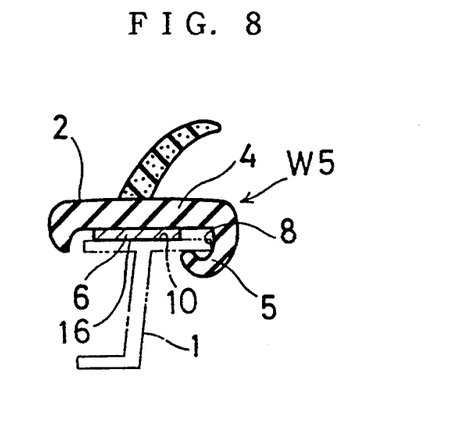
FIG. 8 is a cross section of a weather strip for a roof side illustrating still another example to which the present invention applies.
Figure 9:
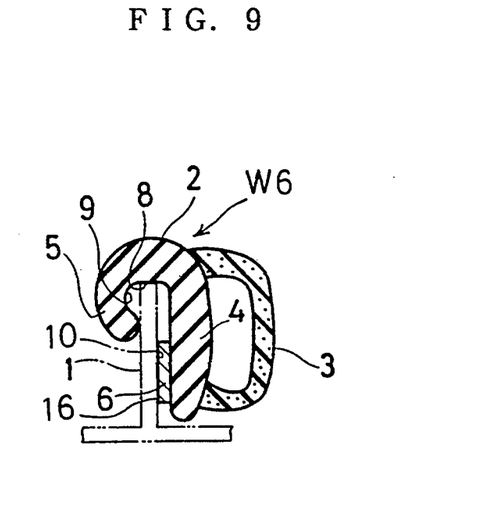
FIG. 9 is a cross section of a weather strip for a door opening illustrating yet another example to which the present invention applies.
Figure 10:
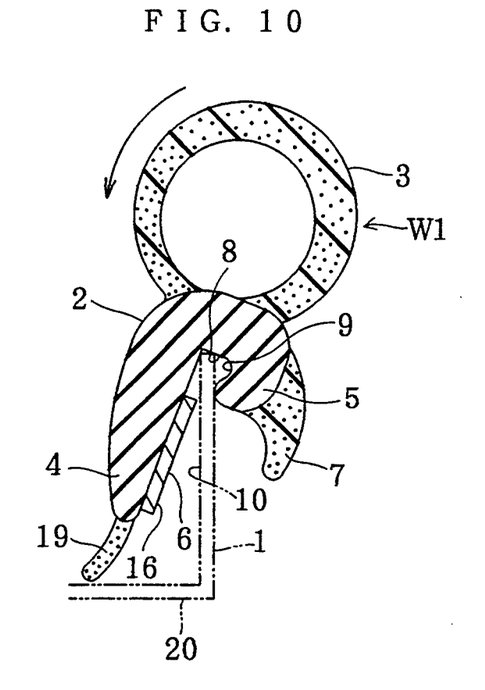
FIG. 10 is a cross section of the assembly operation of another weather strip of the first embodiment of the present invention.
Figure 11:
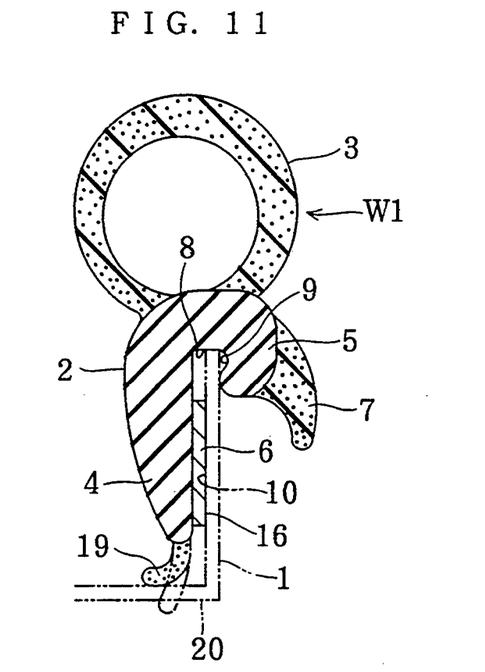
FIG. 11 is a cross section after assembly of the weather strip in FIG. 10.

The present invention may also apply, for example, to a weather strip W4 for a door glass as shown in FIG. 7, a weather strip W5 for roof side as shown in FIG. 8, and a weather strip W6 for door opening or frame as shown in FIG. 9. In these examples, the weather strips W4-W6 can be easily and accurately assembled onto the flange 1 of an automobile body in a manner similar to that of the foregoing embodiments. Furthermore, as shown in FIG. 10, the weather strip W1 of the first embodiment may be provided with a supporting lip 19 of a tongue-shaped section, preferably made from EPDM sponge rubber and formed by common extrusion, at the lower end portion of long holding piece 4. Supporting lip 19 is in friction contact with a panel 20 of an automobile body, as shown in FIG. 11. The frictional resistance between the supporting lip 19 and the panel 20 serves to prevent clockwise rotation (as viewed in FIG. 11) of the weather strip W1, which may result from external forces applied after adhesion. As a result, the weather strip can be even more securely adhered to flange 1.

Figure 12:
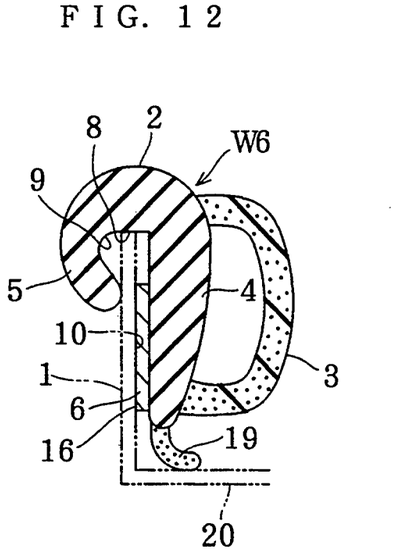
FIG. 12 is a cross section illustrating another example to which the weather strip in FIG. 9 applies.

As shown in FIG. 12, the supporting lip 19 can also be provided with the weather strip W6 of FIG. 9.

It has been made apparent that several different embodiments of this invention are possible without departing from the spirit and scope thereof. Therefore, it is to be understood that the present invention incudes all modifications encompassed within the spirit and scope of the following claims.

What is claimed is:

1. A weather strip for an automobile comprising:
   a trim portion adapted to be secured to a flange of an automobile, said trim portion having a first and second holding piece and a concave portion disposed therebetween, said concave portion being engageable with an end of said flange in a manner which enables the concave portion to remain in slidable contact with the flange as said trim portion is rotated with respect to the flange as the weather strip is secured to said flange; and
   an adhesive provided on an inner surface of said first holding piece for adhering said trim portion to said flange, said adhesive being positioned on said inner surface such that said adhesive is brought into contact with said flange as a result of the trim portion being rotated, said second holding piece adapted to contact said flange when said weather strip is secured to said flange.

2. A weather strip for an automobile according to claim 1, wherein said adhesive is double sided tape.

3. A weather strip for an automobile according to claim 1, wherein said trim portion is formed from a solid rubber material.

4. A weather strip for an automobile according to claim 3, wherein said solid rubber material is EPDM rubber.

5. A weather strip for an automobile according to claim 1, wherein said trim portion is provided with a sealing element at an outer surface thereof.

6. A weather strip for an automobile according to claim 5, wherein said sealing element comprises electrostatic hairs fixed to its outer surface.

7. A weather strip for an automobile according to claim 5, wherein said sealing element comprises urethane at its outer surface.

8. A weather strip for an automobile according to claim 5, wherein said sealing element is substantially hollow.

9. A weather strip for an automobile according to claim 5, wherein said sealing element is formed of sponge rubber.

10. A weather strip for an automobile according to claim 1, wherein said concave portion has a diameter larger than a thickness of said flange.

11. A weather strip for an automobile according to claim 1, wherein said concave portion has a diameter substantially equal to a thickness of said flange.

12. A weather strip for an automobile according to claim 1, wherein said trim portion comprises an end lip for bearing against the body of said automobile, said end lip being secured to a tip end of said first holding piece.

13. A weather strip for an automobile comprising:
    a trim portion adapted to be secured to a flange of an automobile, said trim portion having first and second holding pieces and a concave portion connected therebetween, said concave portion being engageable with an end of said flange in a manner which enables the concave portion to remain in slidable contact with the flange as said trim portion is rotated with respect to the flange as the weather strip is secured to the flange; and
    an adhesive provided on an inner surface of said first holding piece for adhering said trim portion to said flange, said second holding piece adapted to contact said flange When said weather strip is secured to said flange.

14. A weather strip for an automobile according to claim 13, wherein said adhesive is double sided tape.

15. A weather strip for an automobile according to claim 14, wherein the width of said first holding piece correlates to the width of said adhesive double sided tape, and said second holding piece has a tip end thereof disposed substantially at the same level as an inner edge of said adhesive double sided tape.

16. A weather strip for an automobile according to claim 13, wherein said trim portion is provided with a sealing element at an outer surface thereof.

17. A weather strip for an automobile according to claim 16, wherein said sealing element is substantially hollow.

18. A weather strip for an automobile according to claim 16, wherein said sealing element is formed of sponge rubber.

19. A weather strip for an automobile according to claim 16, wherein said sealing element comprises electrostatic hairs fixed to its outer surface.

20. A weather strip for an automobile according to claim 16, wherein said sealing element comprises urethane at its outer surface.

21. A weather strip for an automobile according to claim 13 wherein said second holding piece is provided with a recess at an inner surface of said base portion.

22. A weather strip for an automobile according to claim 13 wherein said second holding piece is thinner than said first holding piece.

23. A weather strip of an automobile according to claim 13, wherein said first holding piece is provided with at least one projection for bearing against said flange, said at least one projection being disposed at the inner surface of said first holding piece.

24. A weather strip for an automobile according to claim 13, wherein said trim portion comprises an end lip for bearing against the body of an automobile, said end lip being secured to a tip end of said first holding piece.

25. A weather strip for an automobile comprising:

a trim portion adapted to be secured to a flange of an automobile and having a first holding piece of a predetermined length, a second holding piece having a length less than said predetermined length, and a concave portion connected between said holding pieces, said holding pieces extending from opposite ends of said concave portion, said trim portion being constructed and arranged to enable said concave portion thereof to be slidingly engageable with an end of said flange as the trim portion is rotated to bring said first holding piece towards a first side of said flange where the trim portion is secured to the flange, said second holding piece adapted to contact a second side of said flange when said weather strip is secured to said flange; and an adhesive provided on an inner surface of said first holding piece for adhering said trim portion to said flange, said adhesive being positioned on said inner surface such that said adhesive is brought into contact with said flange as a result of the trim portion being rotated to bring said first holding piece towards the first side of said flange as the trim portion is secured to the flange.

26. A weather strip as claimed in claim 25, wherein said second holding piece remains in contact with said flange as rotation of said trim portion proceeds as said trim portion is secured to said flange.

* * * * *